United States Patent
Haggander

(10) Patent No.: US 7,234,294 B1
(45) Date of Patent: Jun. 26, 2007

(54) OUTLET NOZZLE AND A METHOD FOR MANUFACTURING AN OUTLET NOZZLE

(75) Inventor: Jan Haggander, Trollhattan (SE)

(73) Assignee: Volvo Aero Corporation, Trollhattan (SE)

( * ) Notice: Subject to any disclaimer, the term of this patent is extended or adjusted under 35 U.S.C. 154(b) by 920 days.

(21) Appl. No.: 10/604,335

(22) Filed: Jul. 11, 2003

Related U.S. Application Data

(63) Continuation of application No. PCT/SE02/00020, filed on Jan. 9, 2002.

(60) Provisional application No. 60/261,045, filed on Jan. 11, 2001.

Foreign Application Priority Data

Jan. 11, 2001 (SE) ..................................... 0100076

(51) Int. Cl.
*F02R 11/00* (2006.01)
*B64D 33/04* (2006.01)
*B21D 53/00* (2006.01)

(52) U.S. Cl. .................. 60/267; 239/127.1; 29/890.01

(58) Field of Classification Search .................. 60/267, 60/266; 239/127.1, 127.3; 29/890.01, 890.142
See application file for complete search history.

(56) References Cited

U.S. PATENT DOCUMENTS

| | | | |
|---|---|---|---|
| 2,523,011 A * | 9/1950 | Goddard | 60/201 |
| 3,154,914 A * | 11/1964 | Stockel | 60/260 |
| 3,605,412 A | 9/1971 | Stockel | |
| 4,148,121 A | 4/1979 | Butter et al. | |
| 4,856,163 A | 8/1989 | Horiuchi et al. | |
| 5,221,045 A | 6/1993 | McAninch et al. | |
| 6,308,408 B1 * | 10/2001 | Myers et al. | 29/890.01 |
| 6,467,253 B1 * | 10/2002 | Haggander | 60/267 |

* cited by examiner

*Primary Examiner*—Charles G. Freay
(74) *Attorney, Agent, or Firm*—Novak Druce+Quigg, LLP

(57) ABSTRACT

Method and arrangement for providing an outlet nozzle (10) for use in a liquid fuel rocket engine. The nozzle forms a body of revolution having an axis (11) of revolution and a cross section that varies in diameter along said axis. The nozzle has a wall structure having a plurality of mutually adjacent cooling channels, helically extending substantially in parallel from the inlet end (13) of the nozzle to its outlet end (14). The nozzle includes at least two longitudinally arranged sections (10*a*, 10*b*, 10*c*). A shift between a positive and a negative channel angle in the transition from one section to an adjacent section balances any roll momentum generated by friction of rocket exhausts against the nozzle wall.

12 Claims, 1 Drawing Sheet

OUTLET NOZZLE AND A METHOD FOR MANUFACTURING AN OUTLET NOZZLE

CROSS REFERENCE TO RELATED APPLICATIONS

This application is a continuation patent application of International Application No. PCT/SE02/00020 filed 9 Jan. 2002 which was published in English pursuant to Article 21(2) of the Patent Cooperation Treaty, and which claims priority to Swedish Application No. 0100076-9 filed 11 Jan. 2001 and to U.S. Provisional Application No. 60/261,045 filed 11 Jan. 2001. Said applications are expressly incorporated herein by reference in their entireties.

BACKGROUND OF INVENTION

1. Technical Field

The present invention relates to the field of outlet nozzles for use in liquid fuel rocket engines. Also, the invention relates to a method for manufacturing these nozzles. The invention is especially intended for use with respect to cooled outlet nozzles for rocket motors driven by liquid fuel.

2. Background of the Invention

During operation, a rocket nozzle is subjected to very high stresses, for example in the form of a very high temperature on its inside (on the order of magnitude of 980° F.) and a very low temperature on its outside (on the order of magnitude of 370° F.). As a result of this high thermal load, stringent requirements are placed upon the choice of material, design and manufacture of the outlet nozzle. At a minimum, the need for effective cooling of the outlet nozzle must be considered.

Cooling is provided by attaching individual lengths of tubing on the inside surface of the nozzle. The geometry of each tube is such that it must conform to the conical or parabolic shape of the nozzle. Additionally, the entire inside surface of the nozzle must be covered to prevent "hot spots" which could result in premature failure of the nozzle. Each nozzle typically has a diameter ratio from the aft or large outlet end of the nozzle relative to the forward or small inlet end of the nozzle ranging from 2:1 to 3:1.

According to a previously known method of manufacturing a cooled outlet nozzle, rectangular tubes of constant cross section made from nickel-based steel or stainless steel are utilized and arranged parallel with another, and are welded together.

The tubes are helically wound such that they form an angle of helix in relation to the longitudinal axis of the nozzle, which angle increases progressively from the inlet end of the nozzle to its outlet, thereby forming a bell shaped nozzle wall. Rocket engine exhaust flowing along the inside surface of such a nozzle with helically arranged tubes results in an angled reaction force that endures a roll momentum on the rocket and which must be compensated for by some additional means. These additional means often lead to increased weight and increased flow resistance. Having long channels without any increase in cross section will also affect the coolant flow resistance negatively.

SUMMARY OF INVENTION

An object of the present invention is to provide a nozzle and a method for its manufacture that avoids the problems described above. This is achieved by means of a nozzle that comprises (includes, but is not limited to) at least two longitudinally arranged sections with a shift between a positive and a negative channel angle in the transition from one section to an adjacent section. As a result of the invention, it is possible to reduce the roll momentum created by the helical tube channels.

According to an advantageous embodiment of the invention, the different angles of the cooling channels in the nozzle sections are adapted to quench reaction forces originating from exhaust flowing past the channels. In this manner, it is possible to avoid the roll momentum.

According to another embodiment of the invention, each cooling channel extends helically with respect to the longitudinal axis of the nozzle.

According to one embodiment of the invention, the channels in each section have a constant cross section along their length.

Alternatively, the cross sectional area of the channels of two adjacent nozzle sections may be different. In this embodiment, the cross sectional area of the nozzle channels is preferably larger for a downstream nozzle section than for an upstream nozzle section.

A method according to the invention includes joining a plurality of tubular channels to form a first section of the outlet nozzle in which the channels have an angle of helix in relation to the longitudinal axis of the nozzle. A plurality of tubular channels are also joined to form a second section of the outlet nozzle in which the channels have opposite angles of helix in relation to the longitudinal axis of the nozzle. The sections are then joined to form a composite outlet nozzle having continuous cooling channels.

BRIEF DESCRIPTION OF DRAWINGS

The invention will be further described in the following, in a non-limiting way with reference to the accompanying drawings in which.

DETAILED DESCRIPTION

Figure 1:
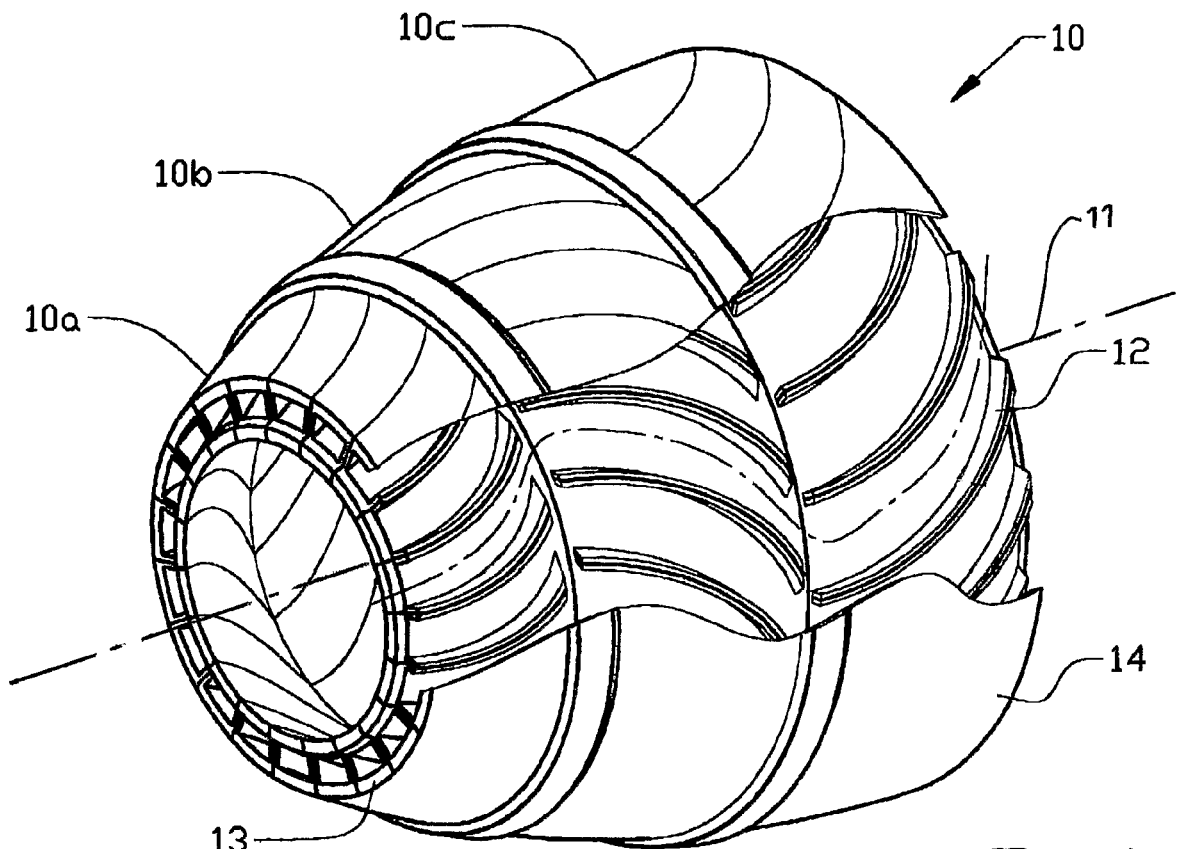
FIG. 1 is a perspective view showing a nozzle configured according to the invention.

FIG. 1 shows a diagrammatic and somewhat simplified side view of an outlet nozzle 10 which is produced according to the present invention. The nozzle is intended for use in rocket engines of the type which uses a liquid fuel, for example liquid hydrogen. The working of such a rocket engine is previously known, per se, and is therefore not described in detail. The nozzle 10 is cooled with the aid of a cooling medium which is preferably also used as fuel in the particular rocket engine. The invention is, how-ever, not limited to outlet nozzles of this type, but can also be used in engines in which the cooling medium is dumped after it has been used for cooling.

The outlet nozzle is manufactured with an outer shape that is substantially bell-shaped. Thus, the nozzle 10 forms a body of revolution having an axis of revolution 11 and a cross section which varies in diameter along said axis.

The nozzle in FIG. 1 has three longitudinally arranged sections 10a, 10b, 10c. It is possible to have a greater number or fewer of these sections.

The nozzle wall of each section is a structure comprising a plurality of mutually adjacent, tubular cooling channels 12 helically extending substantially in parallel to each other from the inlet end of the section to its outlet end.

Rectangular tubes of constant cross section made from nickel-based steel, stainless steel or other heat resistant materials can be used for manufacturing the sections. In this process, the tubes are arranged helically, in parallel with one another, and are welded together. The angle of helix may increase progressively from the inlet end 13 of the nozzle section to its outlet end 14 to form a bell-shaped nozzle wall. The tubes are welded to each other, preferably at the outside, by laser welding. The inside of the nozzle is not welded, which means that the gaps may open up when the nozzle is operating and the thermal cycle is reversed. The maximum thermal stress cycle is therefore limited.

The tubes 12 in adjacent sections are oriented so that there is a shift between a positive and a negative channel angle in the transition from one section to an adjacent section. Thus, the tube channels in two adjacent sections have opposite angles of helix in relation to the longitudinal axis 11 of the nozzle.

Figure 2:
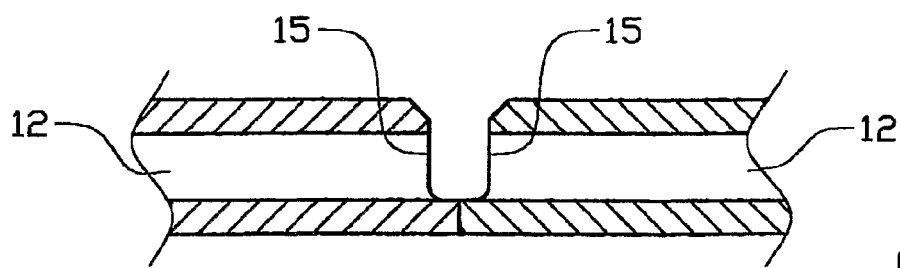
FIG. 2 is a longitudinal, cross-sectional view through a joint between two sections, shown in larger scale and before welding.
Figure 3:
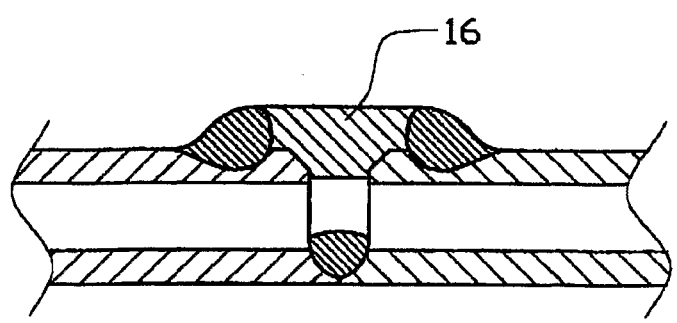
FIG. 3 shows the joint according to FIG. 2, but after welding.

FIG. 2 shows an axial joint of two sections before welding that allows for welding from the outside. For this purpose, a notch 15 has been made at the radial outside of the tube ends of each section. The notches 15 make it possible for the laser beam to reach the inner remote parts of the tubes for fusing them together. Then it is possible to join the sides of the rectangular tubes. Finally, as shown in FIG. 3, a ring 16 is applied over the joint and welded into place to bridge the gap between the two adjoining nozzle sections.

The use of two or more sections in the outlet nozzle makes it possible to change the cross sectional area of the tubes at each axial joint. For example, the radial height of the cross section could be increased to provide more flow area and to reduce the pressure drop in the cooling channels. The restart of the tubes in the transition from one section to the next following section increases the flow area for the constant tube cross section. Only a small number of restarts are needed to reduce the pressure drop to be acceptable for closed engine cycles. Distribution manifolds are needed at the joints to insure pressure and flow distribution.

In the upstream end of the nozzle, it is desirable to keep the cross section small to provide the needed heat flux to reduce the material temperature. Here, the tube thickness could be thinned down while still providing suitable pressure capacity. Thinner walls lead to lower material temperature that increases the cyclic life of the nozzle. In the downstream end of the nozzle, it is desirable to have a large flow area to minimize the pressure drop. The wider tubes need thicker material to maintain the pressure capacity. This goes hand in hand with needs for a stiff nozzle structure for withstanding the side load, external pressure and vibration.

The inside of a finished nozzle is provided with small helical grooves. In the case of unidirectional winding, the friction of the flame creates a reaction momentum that normally would have to be counteracted with some additional means. By shifting the angle of helix in accordance with the invention, the roll momentum can be counter-acted without resorting to additional means. In the case of expander cycle rocket engines, the increased friction leads to more heat being transferred to the coolant and that the turbo-machinery is supplied with more power.

Before welding the tubes together, all the sides of the tube are accessible. The side facing the flame and part of the tube sides facing adjacent tubes may be coated with copper. This will enhance heat transfer from the parts of the tube not directly exposed to the rocket flame. This leads to a reduced material temperature in the load carrying structure.

The invention is not limited to the above-described embodiments, but several modifications are possible within the scope of the following claims. For example, the joining of two sections may be performed differently than described.

The invention claimed is:

1. An outlet nozzle for use in a liquid fuel rocket engine comprising:
    a nozzle body having an axis of revolution and a cross section which varies in diameter along said axis, said body having a wall structure comprising a plurality of mutually adjacent cooling channels helically extending substantially in parallel from the inlet end of the nozzle to its outlet end; and
    the nozzle further comprising at least two longitudinally arranged sections and a shift between a positive and a negative channel angle in the transition from one section to an adjacent section.

2. The outlet nozzle as recited in claim 1, further comprising:
    different angles of the cooling channels in the nozzle sections being adapted to quench reaction forces originating from exhausts flowing past said channels.

3. The outlet nozzle as recited in claim 1, further comprising:
    each cooling channel extending helically with respect to the longitudinal axis of the nozzle.

4. The outlet nozzle as recited in claim 1, further comprising:
    the channels in each section having a constant cross section along their length.

5. The outlet nozzle as recited in claim 1, further comprising:
    the cross sectional area of the channels of two adjacent nozzle sections being different.

6. The outlet nozzle as recited in claim 1, further comprising:
    the channel cross sectional area being larger for a downstream nozzle section than for an upstream nozzle section.

7. The outlet nozzle as recited in claim 1, further comprising:
    the channels having a rectangular cross section.

8. A method for manufacturing an outlet nozzle for use in a liquid fuel rocket engine, said nozzle forming a body of revolution having an axis of revolution and a cross section which varies in diameter along said axis, and having a wall structure comprising a plurality of mutually adjacent cooling channels, helically extending substantially in parallel from the inlet end of the nozzle to its outlet end, said method comprising:
    joining a plurality of the tubular channels to form a first section of the outlet nozzle in which the channels has an angle of helix in relation to the longitudinal axis of the nozzle; and
    joining a plurality of tubular channels to form a second section of the outlet nozzle in which the channels have opposite angles of helix in relation to the longitudinal axis of the nozzle, and
    joining said sections to form a composite outlet nozzle having continuous cooling channels.

9. The method as recited in claim 8, further comprising:
    said joining is realized by means of laser welding and the tubular channels are joined by welding at the outside of the nozzle.

10. The method as recited in claim 8, further comprising:
    forming the tubular channels by means of tubes having a rectangular cross section.

11. The method as recited in claim 8, further comprising:

providing the meeting edges of sections to be joined with notches at the outside to enable welding the remote part of the tubular channels from the outside of the nozzle.

12. The method as recited in claim 11, further comprising: applying a ring shaped element to bridge the notch area, and welding said element to meeting channel ends.

* * * * *